(12) United States Patent  (10) Patent No.: US 8,308,186 B1
Orlowsky et al.  (45) Date of Patent: Nov. 13, 2012

(54) ACTIVE BOLSTER MOUNTING SYSTEM

(75) Inventors: Michael G. Orlowsky, Sterling Heights, MI (US); Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/219,787

(22) Filed: Aug. 29, 2011

(51) Int. Cl.
*B60R 21/206* (2011.01)
(52) U.S. Cl. ...................... 280/728.2; 280/753
(58) Field of Classification Search ............ 280/753, 280/728.2, 730.1, 732, 751, 752
See application file for complete search history.

(56) References Cited

U.S. PATENT DOCUMENTS

| | | | | |
|---|---|---|---|---|
| 6,213,497 | B1* | 4/2001 | Spencer et al. | 280/730.1 |
| 6,619,689 | B2* | 9/2003 | Spencer et al. | 280/730.1 |
| 6,848,715 | B2* | 2/2005 | Nelson et al. | 280/753 |
| 6,971,667 | B2* | 12/2005 | Enders et al. | 280/730.1 |
| 6,976,706 | B2* | 12/2005 | Smith et al. | 280/753 |
| 7,559,605 | B2* | 7/2009 | Yoshikawa et al. | 297/216.1 |
| 7,654,557 | B2* | 2/2010 | Enders | 280/728.2 |
| 8,262,126 | B2* | 9/2012 | Matsushima | 280/728.2 |
| 2004/0108700 | A1* | 6/2004 | Galmiche et al. | 280/753 |
| 2007/0205587 | A1* | 9/2007 | Yoshikawa et al. | 280/730.1 |
| 2007/0235992 | A1* | 10/2007 | Yoshikawa et al. | 280/730.1 |
| 2009/0152848 | A1 | 6/2009 | Sadr et al. | |
| 2009/0152849 | A1 | 6/2009 | Saraf et al. | |
| 2011/0133435 | A1 | 6/2011 | Sadr et al. | |

FOREIGN PATENT DOCUMENTS

WO   WO2006132990 A1   12/2006
* cited by examiner

*Primary Examiner* — Drew Brown
(74) *Attorney, Agent, or Firm* — Gregory P. Brown; MacMillian, Sobanski & Todd, LLC

(57) ABSTRACT

An active bolster system for a vehicle includes a trim substrate panel adapted to be mounted to a structural element of the vehicle, wherein the substrate panel has a bolster opening. A bolster has a main body configured to fit within the bolster opening, wherein the main body has an A-side substantially flush with the substrate panel and a B-side facing the structural element. The main body has a plurality of lateral side tabs extending from the main body, and the main body expands during a deployment of the active bolster system so that a distance between the A-side and B-side increases. A retainer bracket retains the bolster against the substrate panel, wherein the retainer bracket comprises a frame extending around a periphery of the main body. The frame includes a reaction surface disposed against at least a portion of the B-side, a plurality of pinch tabs each pressing a respective lateral side tab against the substrate panel, and a plurality of rigid attachments for directly attaching the is retainer bracket to the substrate panel. Reaction forces applied by the bolster against the reaction surface during at least an initial expansion of the main body during the deployment are transmitted by the retainer bracket to the substrate panel so that separation is urged between the main body and the substrate panel, and the substrate panel is urged against the structural element.

5 Claims, 4 Drawing Sheets

ACTIVE BOLSTER MOUNTING SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for automotive crash protection systems, and, more specifically, to a system for retaining an active bolster within an interior trim panel.

In order to reduce loads applied to an occupant from impact during a vehicle crash, active bolster systems are sometimes deployed within a vehicle interior. They may be located in an instrument panel or glove box door to protect the knees or in a door panel, window pillar, or seat structures to protect against side impacts. A typical active bolster is formed from a plastic material shaped into a bellows configuration on one surface. Upon the occurrence of a crash event of sufficient magnitude, an inflator is activated to inflate the bolster and expand the bellows to create an impact cushion.

An active bolster assembly requires a mounting that ensures a proper orientation and support during a deployment toward the occupant. It must be mounted to ensure that it deploys without any obstructions or misalignments that could degrade its trajectory or performance, and preferably not produce forces that would dislodge the trim panel from its mounting to an underlying structural element. Moreover, the appearance of the bolster itself and the fit with surrounding trim must meet craftsmanship specifications such as gap size, gap consistency, and flushness.

An active bolster is typically mounted to a fixed structural element of the vehicle in order to support the bolster against expansion and to receive the forces applied against the bolster during impact with an occupant. In the case of an active side impact system, the bolster may be mounted to a door frame. A door trim substrate panel is also mounted to the door frame to provide the interior surface of the door. The trim substrate panel includes an opening for receiving the bolster, and the bolster has an outer surface with a desired color and texture to match the trim panel. With both the bolster and trim substrate panel independently mounted to the door frame, it can be a challenge to accurately control placement of the bolster within the opening so that the gap has a constant width around the periphery and so that the A-surface flushness (i.e., matching the depth of the outer surfaces) has the desired appearance. A misalignment of the bolster with the opening may introduce interference between an is expanding bolster and the trim substrate panel which could cause the substrate panel to dislodge from its installed position or the breakage of a portion of the substrate panel from the assembly.

SUMMARY OF THE INVENTION

The present invention employs a bracket for mounting a bolster directly to a trim panel so that the gap and flushness of the interface between the bolster and trim panel are well controlled. A high quality of pre-deployment appearance and deployment performance are achieved. Moreover, the active bolster is not directly mounted to the underlying vehicle structural component so that the forces created by the bolster during the initial inflation of the bolster before impacting an occupant help keep the trim panel from becoming dislodged.

In one aspect of the invention, an active bolster system is provided for a vehicle. A trim substrate panel is adapted to be mounted to a structural element of the vehicle, wherein the substrate panel has a bolster opening. A bolster has a main body configured to fit within the bolster opening, wherein the main body has an A-side substantially flush with the substrate panel and a B-side facing the structural element. The main body has a plurality of lateral side tabs extending from the main body, and the main body expands during a deployment of the active bolster system so that a distance between the A-side and B-side increases. A retainer bracket retains the bolster against the substrate panel, wherein the retainer bracket comprises a frame extending around a periphery of the main body. The frame includes a reaction surface disposed against at least a portion of the B-side, a plurality of pinch tabs each pressing a respective lateral side tab against the substrate panel, and a plurality of rigid attachments for directly attaching the retainer bracket to the substrate panel. Reaction forces applied by the bolster against the reaction surface during at least an initial expansion of the main body during the deployment are transmitted by the retainer bracket to the substrate panel so that separation is urged between the main body and the substrate panel, and the substrate panel is urged against the structural element.

DETAILED DESCRIPTION OF PREFERRED EMBODIMENTS

A bolster of the present invention is comprised of a hollow chamber which may be blow molded as a single unit or injection molded in separate parts that may be welded together to form a hermetically sealed chamber. One surface of the chamber provides an A-side as a continuous "Class A" passenger-facing surface of a door panel, for example. The B-side the bolster is mounted to face a structural element of a vehicle such as an internal door frame.

Figure 1:
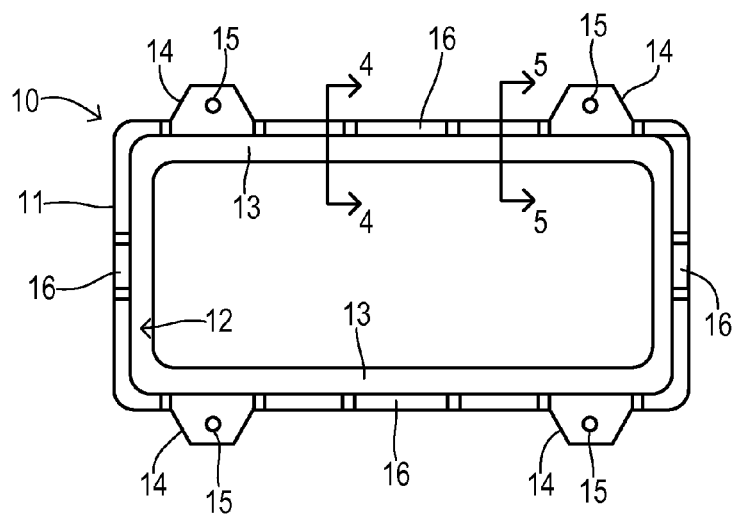
FIG. 1 is a front, plan view of a retainer bracket according to one embodiment of the invention.

An active bolster may be attached to a trim substrate panel using a retainer bracket 10 as shown in FIG. 1. Retainer bracket 10 is shaped as a frame 11 that may be manufactured as an injection molded plastic or a stamped metal component, for example. Frame 11 has a generally L-shaped channel 12 with a reaction surface 13 for receiving a B-side of the bolster.

Reaction surface 13 may extend concentrically along an inner periphery of frame 11 as shown in FIG. 1, or may alternatively be formed as a planar backing surface completely filling the area behind the bolster or any other portions of that area.

Figure 2:
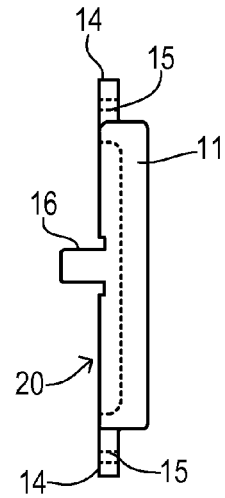
FIG. 2 is a right side view of the retainer bracket of FIG. 1.
Figure 3:
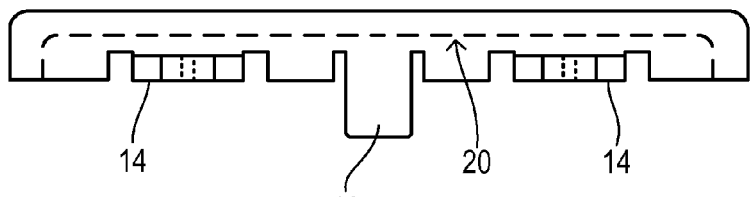
FIG. 3 is a top view of the retainer bracket of FIG. 1.
Figure 4:
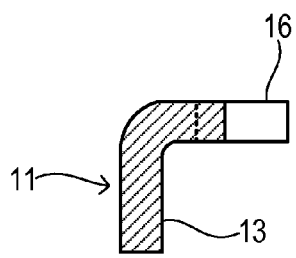
FIG. 4 is a partial cross-sectional view along line 4-4 of FIG. 1.
Figure 5:
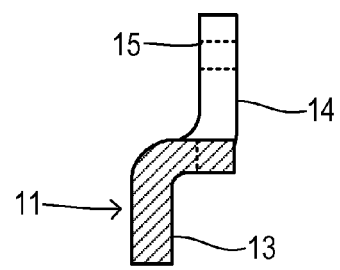
FIG. 5 is a partial cross-sectional view along line 5-5 of FIG. 1.

Rigid attachment of retainer bracket 10 to a trim substrate panel is provided using mounting plates 14 with respective through holes 15. Extending outwardly from frame 11 are a plurality of pinch tabs 16. As also seen in the side view of FIG. 2 and the top view of FIG. 3, frame 11 creates a receptacle 20 to receive the bolster. As shown in the cross-sectional views of FIGS. 4 and 5, pinch tabs 16 and mounting plates 14 project from frame 11 toward a trim substrate panel to encompass the B-side of the bolster.

Figure 6:
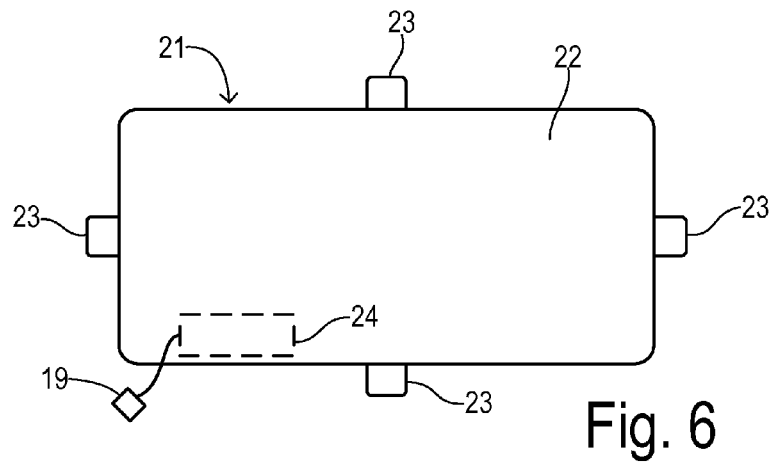
FIG. 6 is a front, plan view of a bolster.

FIG. 6 is a front plan view of a bolster 21 having a main body 22 in the form of a chamber with an internal bellows. On the lateral sides of main body 12, a plurality of lateral side tabs 23 extend outwardly to facilitate mounting of bolster 21. Preferably, side tabs 23 are integrally molded with main body 22. Inside the chamber of main body 22, an inflator 24 is mounted for inflating the chamber in response to an activation signal received via an electrical pigtail connector 19.

Figure 7:
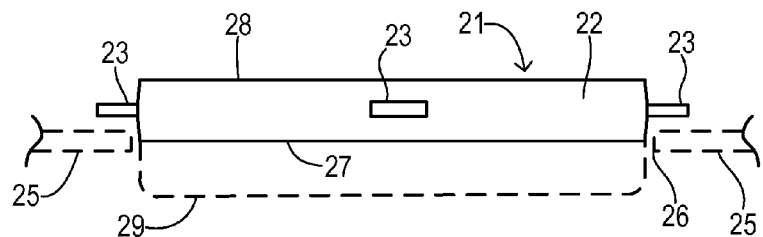
FIG. 7 is a top view of the bolster of FIG. 6.

As also shown in the top view of FIG. 7, lateral side tabs 23 are formed as relatively flat plates which may preferably all lie in a common plane. Main body 22 is mounted within an opening 26 in a trim substrate panel 25. Bolster 21 has an A-side 27 and a B-side 28, wherein A-side 27 is substantially flush with an interior Class A surface of substrate panel 25 prior to deployment. During deployment, bolster 21 inflates so that A-side 27 expands to the configuration shown at 29.

Figure 8:
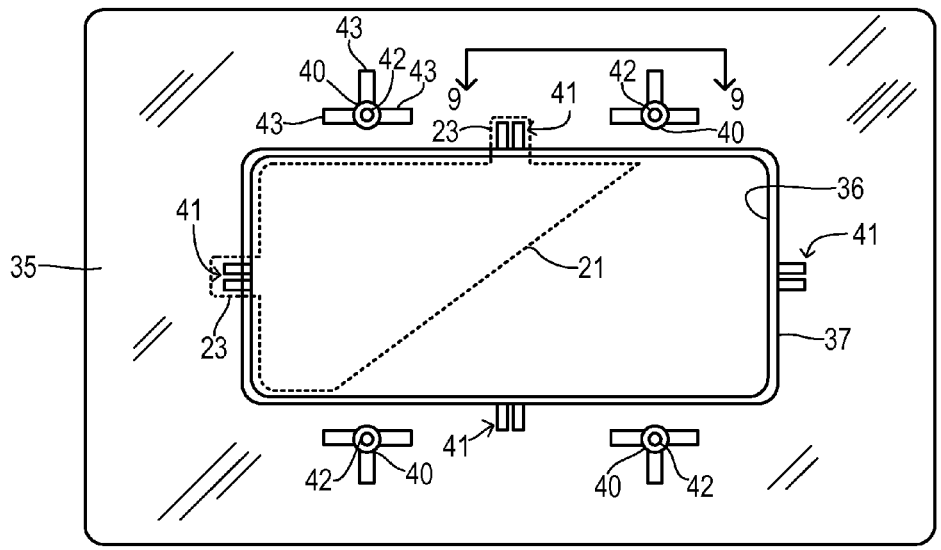
FIG. 8 is a rear, plan view of a trim substrate panel.

FIG. 8 shows an inner, Class B surface of a trim substrate panel 35 with an opening 36 configured to receive bolster 21 (a portion of which is shown in phantom). Opening 36 has a lip 37 to provide a smooth edge. Disposed around opening 36 are a plurality of mounting posts 40 and a plurality of pinch pads 41. Each pinch pad 41 is preferably comprised of a pair of upstanding ribs that are configured to receive a respective lateral side tab 23 of bolster 21. Mounting posts 40 are arranged to receive a respective mounting plate 14 of retainer bracket 10. Each mounting post 40 includes a bore 42 to be aligned with a respective through hole 15 of each mounting plate 14. Bores 42 may be threaded for receiving respective threaded fasteners for rigidly attaching the retainer bracket. Consequently, pinch tabs 16 extend toward pinch pads 41 so that side tabs 23 are retained between the pinch tabs and pinch pads. Mounting posts 40 may also preferably include reinforcing walls 43.

Figure 9:
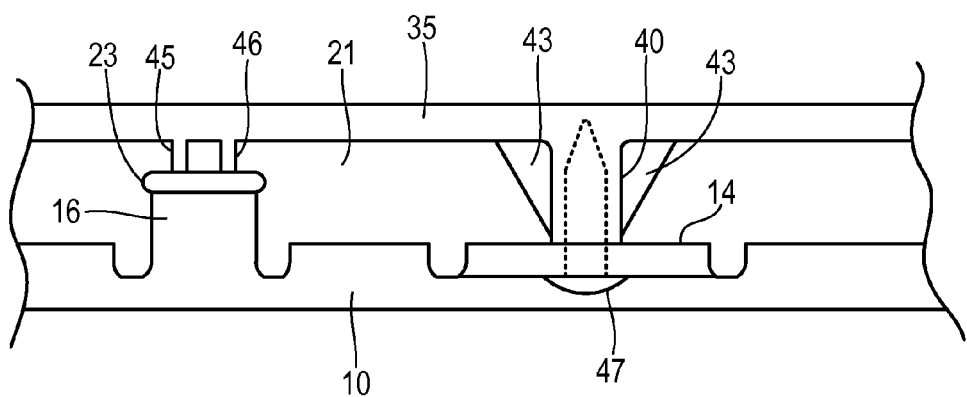
FIG. 9 is a partial top view of an assembly of the invention.
Figure 10:
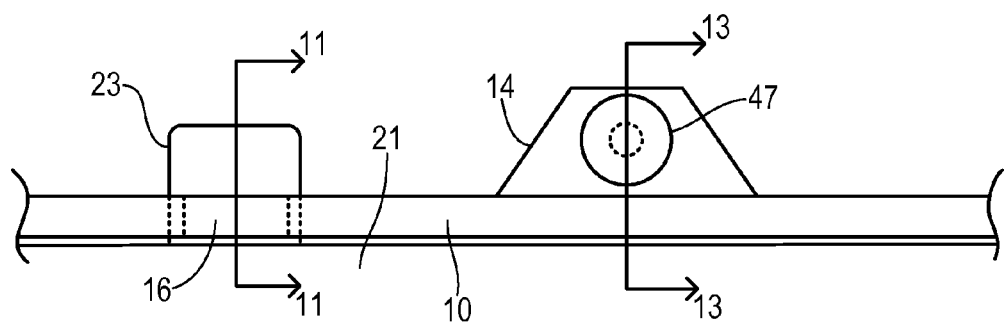
FIG. 10 is a partial rear view of the assembly of FIG. 9.

FIG. 9 shows the interface between trim substrate panel 35 retainer, bracket 10, and bolster 21. Lateral side tab 23 rests against pinch pad ribs 45 and 46, while pinch tab 16 compresses side tab 23 against ribs 45 and 46 as a result of the connection of retainer bracket 10 established by a fastener 47 that passes through mounting plate 14 into mounting post 40. FIG. 10 is a rear plan view corresponding to the top view of FIG. 9. Retainer bracket 10 is accurately positioned as a result of the alignment of the mounting plates with the mounting posts, whereby the relative location of bolster 21 with respect to the trim substrate panel (i.e., the gap and flushness) meets the desired specifications.

Figure 11:
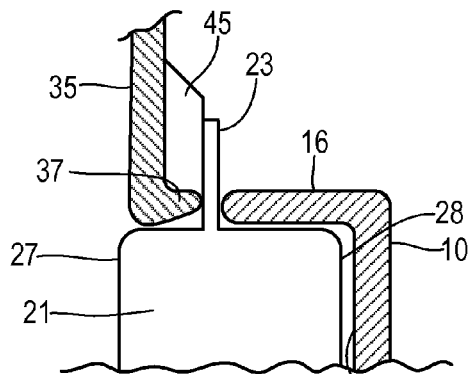
FIG. 11 is partial cross-sectional view of the assembly along line 11-11 of FIG. 10.
Figure 12:
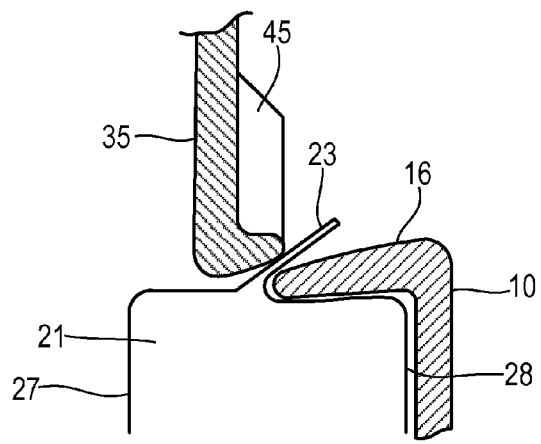
FIG. 12 shows deformation of the assembly occurring during a deployment.

FIG. 11 shows a cross section taken along line 11-11 of FIG. 10. Flushness of A-side 27 of bolster 21 is controlled by the setoff distance from lateral side tab 23. B-side 28 of bolster 21 may preferably bear against reaction surface 13 of retainer bracket 10. In a preferred embodiment, bolster 21 including side tabs 23 are formed of a flexible thermoplastic similar to the material forming trim substrate panel 35 (e.g., ABS, PVC, or TPO). FIG. 12 illustrates bolster 21 after expansion during a deployment such that a distance between A-side 27 and B-side 28 has increased. During the expansion, side tab 23 has moved forward resulting in mutual deformation of side tab 23 and pinch tab 16. Prior to deployment (FIG. 11), side tab 23 and pinch tab 16 extend substantially perpendicular to each other. After deformation during deployment (FIG. 12) side tab 23 and pinch tab 16 have moved toward becoming more parallel with each other. As the deformation occurs, forces are transmitted to trim substrate panel 35, which urge it against the structural element such as a door frame. Later during the deployment, retainer bracket 10 may bottom out against the structural element (e.g., door frame) so that reaction forces during the phase when the occupant impacts the bolster are transmitted to the structural element.

Figure 13:
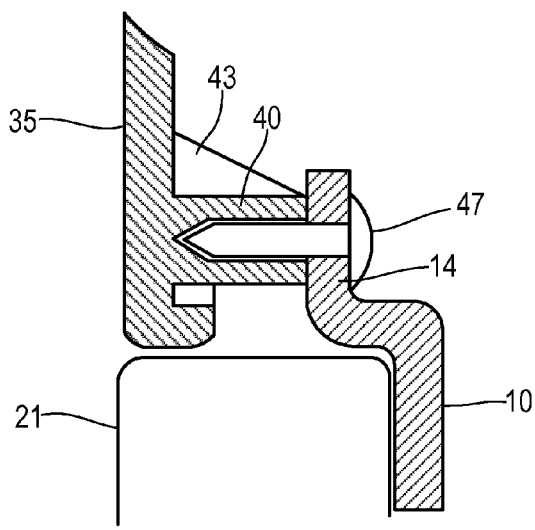
FIG. 13 is partial cross-sectional view of the assembly along line 13-13 of FIG. 10.

FIG. 13 shows the rigid attachment between retainer bracket 10 and trim substrate panel 35 wherein fastener 47 ensures that mounting plate 14 remains against mounting post 40. Thus, the initial reaction forces generated by bolster 21 against frame 10 are transmitted via mounting plate 14 and mounting post 40 to urge trim substrate panel 35 toward the B-side to prevent dislodging or breaking off of any portions of panel 35.

What is claimed is:

1. An active bolster system for a vehicle, comprising:
a trim substrate panel adapted to be mounted to a structural element of the vehicle, wherein the substrate panel has a bolster opening;
a bolster having a main body configured to fit within the bolster opening, wherein the main body has an A-side substantially flush with the substrate panel and a B-side facing the structural element, wherein the main body has a plurality of lateral side tabs extending from the main body, and wherein the main body expands during a deployment of the active bolster system so that a distance between the A-side and B-side increases; and
a retainer bracket for retaining the bolster against the substrate panel, wherein the retainer bracket comprises a frame extending around a periphery of the main body, the frame including a reaction surface disposed against at least a portion of the B-side, a plurality of pinch tabs each pressing a respective lateral side tab against the substrate panel, and a plurality of rigid attachments for directly attaching the retainer bracket to the substrate panel;
wherein reaction forces applied by the bolster against the reaction surface during at least an initial expansion of the main body during the deployment are transmitted by the retainer bracket to the substrate panel so that separation is urged between the main body and the substrate panel.

2. The system of claim 1 wherein the lateral side tabs and the pinch tabs are sufficiently flexible so that they deform during the deployment.

3. The system of claim 2 wherein each pair of a lateral side tab and a respective pinch tab initially extend substantially perpendicular to each other and then deform toward becoming parallel during the deployment.

4. The system of claim 1 wherein the trim substrate panel is comprised of a plurality of pinch pads spaced around the bolster opening, wherein each lateral side tab is pinched between a respective pinch pad and a respective pinch tab.

5. The system of claim 1 wherein the trim substrate panel includes a plurality of mounting posts spaced around the bolster opening, wherein the retainer bracket includes a plurality of mounting plates, and wherein each mounting plate is attached to a respective mounting post by a respective fastener.

* * * * *